United States Patent
Zhang et al.

(10) Patent No.: US 12,311,812 B2
(45) Date of Patent: May 27, 2025

(54) INDICATOR ASSEMBLY OF A SUPPORTING LEG DEVICE FOR A SAFETY SEAT AND SAFETY SEAT

(71) Applicant: Bambino Prezioso Switzerland AG, Steinhausen (CH)

(72) Inventors: Daliang Zhang, Steinahusen (CH); Ganqing Fang, Steinhausen (CH)

(73) Assignee: BAMBINO PREZIOSO SWITZERLAND AG, Steinhausen (CH)

( * ) Notice: Subject to any disclaimer, the term of this patent is extended or adjusted under 35 U.S.C. 154(b) by 0 days.

(21) Appl. No.: 18/037,867

(22) PCT Filed: Jan. 5, 2022

(86) PCT No.: PCT/EP2022/050159
§ 371 (c)(1),
(2) Date: May 19, 2023

(87) PCT Pub. No.: WO2022/148784
PCT Pub. Date: Jul. 14, 2022

(65) Prior Publication Data
US 2024/0001820 A1    Jan. 4, 2024

(30) Foreign Application Priority Data
Jan. 5, 2021 (CN) .......................... 202110006101.X

(51) Int. Cl.
*B60N 2/28* (2006.01)
(52) U.S. Cl.
CPC ......... *B60N 2/2824* (2013.01); *B60N 2/2869* (2013.01)
(58) Field of Classification Search
CPC ...... B60N 2/269; B60N 2/268; B60N 2/2824; A47D 1/004; A47D 1/002
See application file for complete search history.

(56) References Cited

U.S. PATENT DOCUMENTS

| 9,221,368 | B2 | 12/2015 | Hou et al. |
| 11,691,543 | B2 * | 7/2023 | Ma .................. B60N 2/2821 |
| | | | 297/183.6 |
| 2014/0327281 | A1 | 11/2014 | Hou et al. |

FOREIGN PATENT DOCUMENTS

| CN | 103042953 A | 4/2013 |
| CN | 203267824 U | 11/2013 |

(Continued)

OTHER PUBLICATIONS

Notice of Reasons for Refusal Issued in Corresponding Japanese Patent Application No. 2023-532130, Mailed Date: May 7, 2024, 6 pages.

(Continued)

*Primary Examiner* — Milton Nelson, Jr.
(74) *Attorney, Agent, or Firm* — Volpe Koenig

(57) ABSTRACT

An indicator assembly of a supporting leg device for a safety seat and a safety seat are provided. The indicator assembly includes: an indicator housing having an indicator window; an indicating member including a first area and a second area which are adjacent to each other; a first elastic member driving the indicating member to pivot to a first position; an pushing member including a ground contact end that protrudes from the bottom of the supporting leg device; a traction member movably positioned within a hollow sleeve, wherein a first end of the traction member protrudes from the upper end of the sleeve and is fixed to the indicating member, and a second end of the traction member protrudes from the lower end of the sleeve and is configured that an upward movement of the pushing member drives an upward movement of the second end of the traction member.

18 Claims, 13 Drawing Sheets

(56) References Cited

FOREIGN PATENT DOCUMENTS

| | | | |
|---|---|---|---|
| CN | 203666434 U | 6/2014 | |
| CN | 204020627 U | 12/2014 | |
| CN | 204077432 U | 1/2015 | |
| CN | 105329123 A | 2/2016 | |
| CN | 205344586 U | 6/2016 | |
| CN | 107813738 A | 3/2018 | |
| CN | 108082012 A | 5/2018 | |
| CN | 207697564 U | 8/2018 | |
| CN | 208359971 U | 1/2019 | |
| CN | 109398174 A | 3/2019 | |
| CN | 208585134 U | 3/2019 | |
| CN | 109823242 A | 5/2019 | |
| CN | 110525293 A | 12/2019 | |
| CN | 107826001 B | 5/2020 | |
| CN | 210502383 U | 5/2020 | |
| CN | 211543324 U | 9/2020 | |
| DE | 202007013091 U1 | 2/2008 | |
| DE | 202009001975 U1 * | 7/2009 | ............ B60N 2/002 |
| DE | 202013103189 U1 | 1/2014 | |
| DE | 202015104792 U1 | 1/2016 | |
| EP | 2210769 A2 * | 7/2010 | ........... B60N 2/0272 |
| FR | 2864482 A1 | 7/2005 | |
| GB | 2490414 A | 10/2012 | |
| GB | 2523447 A | 8/2015 | |
| JP | 2013159339 A | 8/2013 | |
| JP | 2015117020 A | 6/2015 | |
| JP | 2017105348 A | 6/2017 | |
| JP | 2018526282 A | 9/2018 | |
| TW | 200714496 A | 4/2007 | |
| TW | 201601951 A | 1/2016 | |

OTHER PUBLICATIONS

First Office Action Issued in Corresponding Taiwanese Patent Application No. 112134041, Mailed Date: Mar. 25, 2024, 12 pages.
Decision to Grant Issued in Corresponding Japanese Patent Application No. 2023-524668, Mailed Date: May 7, 2024, 5 pages.
First Office Action Issued in Corresponding Chinese Patent Application No. 202011137746.9, Mailed Date: May 16, 2024, 15 pages.
Office Action issued in corresponding Taiwanese Application No. 112106850 dated Aug. 30, 2023.
International Search Report and Written Opinion for Application No. PCT/EP2022/050159 dated Apr. 4, 2022.
International Search Report and Written Opinion for Application No. PCT/IB2021/059665 dated Jan. 28, 2022.
Taiwanese Office Action for Application No. 110137825 dated Aug. 31, 2022.
Taiwanese Office Action for Application No. 111100221 dated Nov. 29, 2022.

* cited by examiner

INDICATOR ASSEMBLY OF A SUPPORTING LEG DEVICE FOR A SAFETY SEAT AND SAFETY SEAT

CROSS-REFERENCE TO RELATED APPLICATIONS

This application is a National Stage application of PCT/EP2022/050159, filed on Jan. 5, 2022, which claims the benefit of Chinese Application No. 202110006101.X, filed on Jan. 5, 2021, both of which are incorporated herein by reference in their entirety.

TECHNICAL FIELD

This disclosure relates to the technical field of a safety seat, and more particularly, to an indicator assembly of a supporting leg device for a safety seat.

BACKGROUND

A child safety seat is a kind of seat specially designed for children at different ages and effectively improving safety of the children in a vehicle.

SUMMARY

An indicator assembly of a supporting leg device for a safety seat is proposed. The indicator assembly includes: an indicator housing positioned at a top of the supporting leg device and having an indicator window that is formed by penetrating the indicator housing; an indicating member including a first area and a second area which are adjacent to each other and have different colors or patterns, the indicating member being pivotally accommodated in the indicator housing so that the first area and the second area can be alternatively exposed from the indicator window; a first elastic member contacting with the indicating member and driving the indicating member to pivot to a first position; an pushing member inside the supporting leg device and movable up and down relative to a bottom of the supporting leg device, the pushing member including a ground contact end that protrudes from the bottom of the supporting leg device; a traction member movably positioned within a hollow sleeve, wherein the sleeve has an upper end configured to be immobile relative to the top of the supporting leg device, and a lower end configured to be immobile relative to the bottom of the supporting leg device; a first end of the traction member protrudes from the upper end of the sleeve and is fixed to the indicating member, so that the indicating member is pulled so as to pivot to a second position, and a second end of the traction member protrudes from the lower end of the sleeve and is configured that an upward movement of the pushing member drives an upward movement of the second end of the traction member; wherein when the ground contact end of the pushing member does not touch the ground, the indicating member pivots to the first position and the first area is exposed from the indicating window; and when the ground contact end of the pushing member touches the ground, the pushing member moves upward relative to the bottom of the supporting leg device to drive the second end of the traction member to move upward, the first end of the traction member moves downward relative to the top of the supporting leg device to pull the indicating member, the indicating member pivots to the second position, and the second area is exposed from the indicating window.

BRIEF DESCRIPTION OF THE DRAWINGS

The accompanying drawings, which are incorporated in and constitute a part of this specification, illustrate examples of the present disclosure, together with the description serve to explain principles of the present disclosure.

In the drawings.

Figure 1:
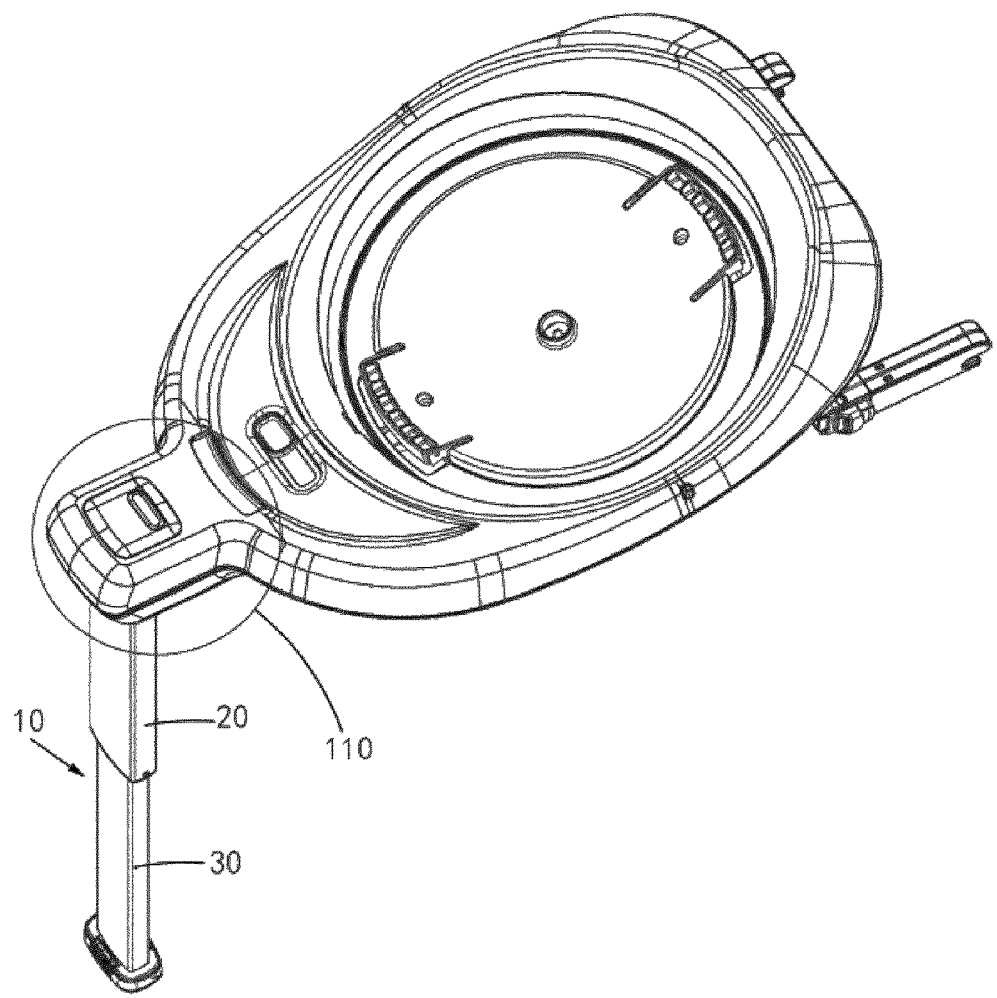
FIG. 1 is a perspective view of a base and a supporting leg device for a safety seat.

Reference numbers are listed as follows:
  10 supporting leg device
    11 top
    12 bottom
  20 first tube
  30 second tube
    31 upper end
  40 frame
  100 indicating member
    101 first area
    102 second area
    103 pivot shaft
  110 indicator housing
    111 indicator window
  120 first elastic member
  130 sleeve upper end fixing member
  200 pushing member
    201 ground contact end
    202 upper part
    210 second elastic member
  300 traction member
    301 first end
    302 second end
  310 sleeve
    311 upper end
    312 lower end 313 first loop
314 second loop
310A first section
310B second section
310C node
400 remaining member
401 sleeve remaining part
500 sleeve lower end fixing member
600 driving member
601 upper part
610 third elastic member
700 post member

DETAILED DESCRIPTION

The present disclosure will be described in detail with reference to the accompanying drawings. For ease of description, the terms "upper", "lower", "top", "bottom" and other terms in the present disclosure refer to the orientation in the accompanying drawings.

It is provided with a supporting leg device for a child's safety seat, which is installed on a base of the child's safety seat and supported on a ground of the vehicle, thus enhance the anti-overturning and anti-impact capability of child's safety seat and protect child safe. However, it is not convenient for the user to lean over and check whether the supporting leg device has touched the ground of the vehicle. Accordingly, it is necessary to develop an indicator assembly of the supporting leg device for the safety seat, to inform thus user whether the device has been already assembled well, so as to avoid the above problem.

In an embodiment shown in FIG. 1, a supporting leg device 10 is disposed at the front end of a base of a safety seat. In use, a bottom 12 of the supporting leg device 10 may be supported on a ground in a vehicle. The supporting leg device 10 includes a first tube 20 and a second tube 30. The second tube 30 is slidably disposed in the first tube 20, so that the supporting leg device 10 can be expanded and contracted. Therefore, when the safety seat is placed on a car seat, the bottom 12 of the supporting leg device can reach the ground in the vehicle by adjusting the length of the supporting leg device 10.

Hereinafter, a structure for displaying whether the supporting leg device 10 touches the ground will be described in detail. The indicator assembly according to the present disclosure is attached to the supporting leg device 10.

The indicator assembly includes an indicator housing 110 that is positioned at a top 11 of the supporting leg device 10, more particularly connected to the upper end of the first tube 20, and has an indicator window 111; an indicating member 100 that is pivotally accommodated in the indicator housing 110; a first elastic member 120 that is disposed in the indicator housing 110 to come into contact with an indicating member 100 and drive the indicating member 100 to pivot in a first direction; a pushing member 200 and a traction member 300, which both are located inside the supporting leg device 10.

As shown in FIG. 1, the indicator housing 110 may be formed as a connecting portion for connecting the supporting leg device 10 and the base of the safety seat. Therefore, the indicator housing 110 may be integrally formed with the supporting leg device 10 and the base of the safety seat, to have sufficient strength therebetween, so as to ensure that the supporting leg device 10 plays a supporting role on the safety seat. Of course, for the convenience of manufacturing and transportation, the indicator housing 110, the supporting leg device 10, and the base of the safety seat may be separately manufactured, and then assembled together by screwing, riveting or welding.

Figure 2:
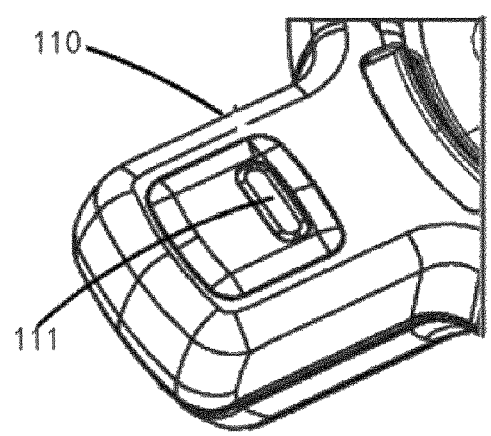
FIG. 2 is an enlarged view of an indicator housing of an indicator assembly of the supporting leg device for the safety seat according to the present disclosure.

An indicator window 111 is formed on the indicator housing 110 and penetrates through the indicator housing 110. In the embodiments shown in FIGS. 1 and 2, the indicator window 111 is formed on the top of the indicator housing 110, so that a user can observe the indicator window 111 more conveniently from above. However, it should be understood that the indicator window 111 may also be formed at the side of the indicator housing 110, so that the user can laterally observe the indicator window 111.

Figure 4:
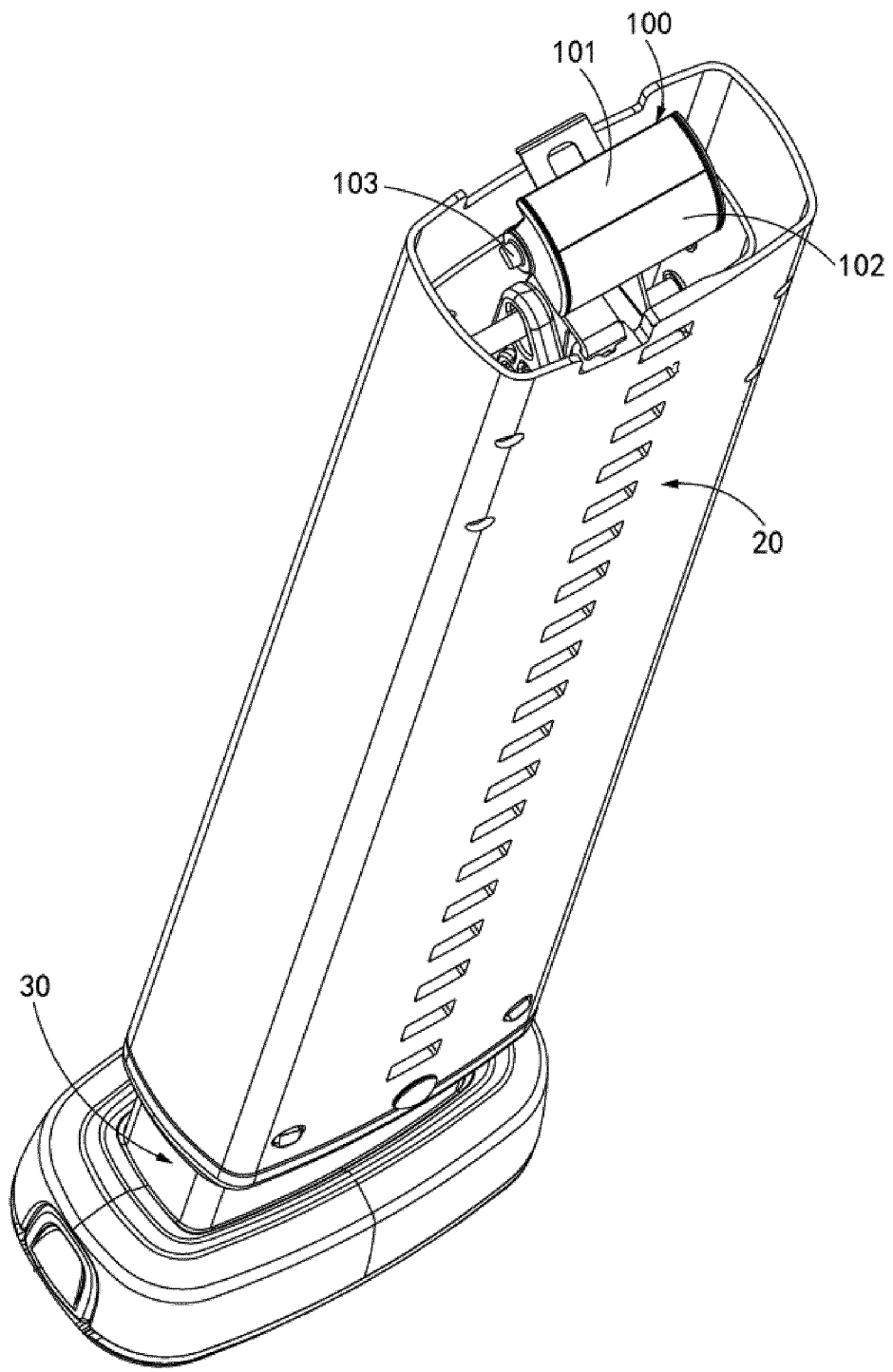
FIG. 4 shows a part of members of the indicator assembly inside the supporting leg device.

The indicating member 100 is pivotably accommodated in the indicator housing 110. As shown in FIG. 4, the indicating member 100 includes a first area 101 and a second area 102 on the outer surface thereof. By means of the pivoting of the indicating member 100, the first area and the second area can be alternatively exposed from the indicator window 111. The first area 101 and the second area 102 may have different colors, such as red and green; or have different patterns, such as characters or figures, so as to be able to display different states of the indicator assembly. For example, when the supporting leg device 10 does not touch the ground, the first area 101 of the indicating member 100 is exposed from the indicator window 111; and when the supporting leg device 10 touches the ground, the second area 102 of the indicating member 100 is exposed from the indicator window 111. Therefore, the user can clearly know whether the supporting leg device 10 touches the ground.

Figure 3:
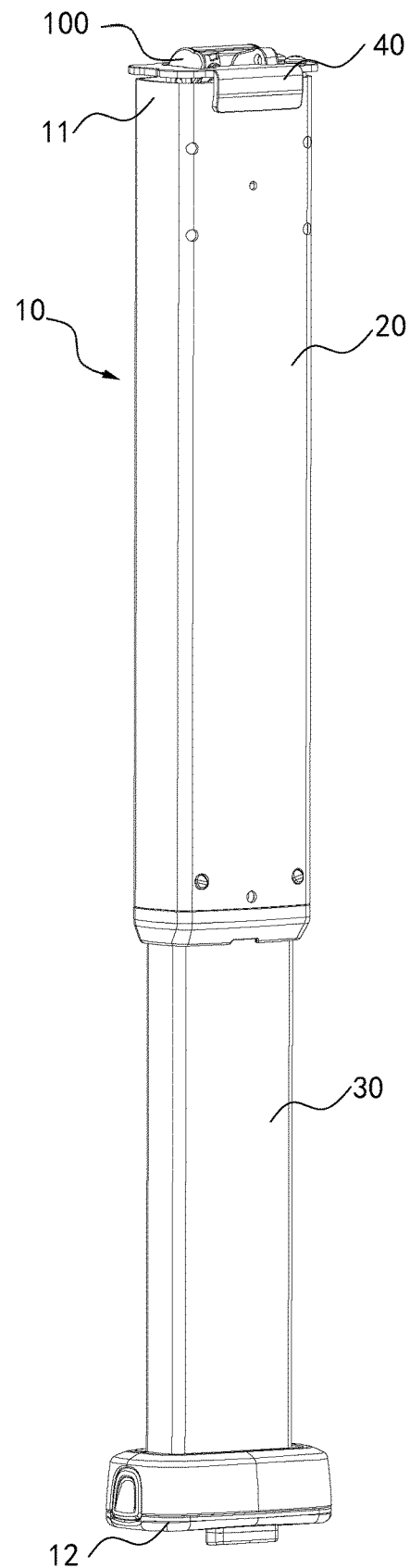
FIG. 3 is a perspective view of supporting leg device of the indicator assembly according to the present disclosure.
Figure 5:
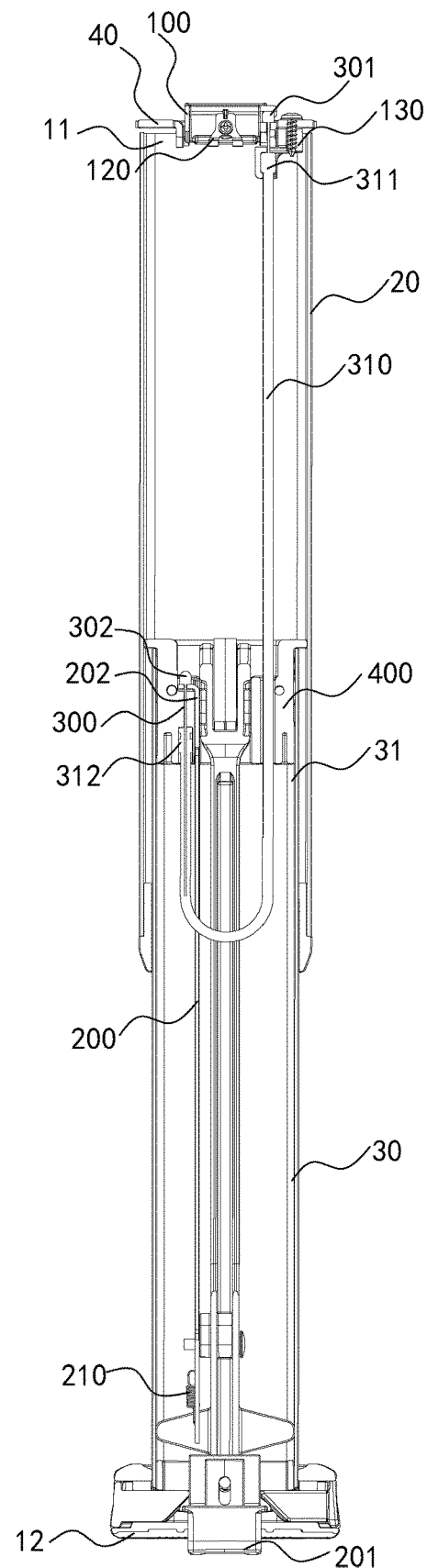
FIG. 5 is a front cross-sectional view of the first embodiment of the indicating assembly according to the present disclosure.

In order to facilitate for the pivoting of the indicating member 100, pivot shafts 103, as shown in FIG. 4, may be formed on both sides of the indicating member 100, and are rotatably supported on the indicator housing 110 or at the top 11 of the supporting leg device 10 (i.e., the first tube 20) or on a frame 40 placed at the top 11 of the supporting leg device 10 (i.e., the first tube 20), as shown in FIG. 3 and FIG. 5, so that the indicating member 100 pivots within the indicator housing 110 around the pivot shafts 103. In other embodiments, the indicating member 100 may also pivot by other means such as sliding rails.

When the supporting leg device 10 does not touch the ground, in order to ensure that the first area 101 is exposed from the indicator window 111, a first elastic member 120 is also disposed in the indicator housing 110, and drives the indicating member 100 to pivot to a first position along a first direction; when the indicating member 100 is at the first position, the first area 101 is exposed from the indicator window 111. The first elastic member 120 is made of an elastic material and may be a spring, an elastic sheet or any elastic element capable of providing driving force. Furthermore, the first elastic member 120 may be integrally formed with the indicating member 100, or the first elastic member and the indicating member may be separately formed and then assembled together. The first elastic member 120 may have any shape.

When the supporting leg device 10 touches the ground, mainly by means of the pushing member 200 and the traction member 300, the indicating member 100 is driven to pivot to a second position along a second direction opposite to the first direction. When the indicating member 100 is at the second position, the second area 102 is exposed from the indicator window 111.

Subsequently, the pushing member 200 and the traction member 300 will be described in general.

The pushing member 200 is positioned inside the supporting leg device 10 and is movable up and down relative to the bottom 12 of the supporting leg device 10. The pushing member 200 includes a ground contact end 201 that protrudes from the bottom 12 of the supporting leg device 10 and touches the ground. The bottom of the ground contact end 201 may be made of a thermoplastic elastomer (TPE) material to play a role of preventing sliding and avoiding impact. Since the ground contact end 201 extends from the bottom 12 of the supporting leg device 10, when the supporting leg device 10 touches the ground, the ground contact end 201 first touches the ground, thereby subjecting an upward acting force from the ground, so that the ground contact end 201 and the pushing member 200 are moved upward relative to the bottom 12 of the supporting leg device 10 until the ground contacting end 201 is completely retracted into the bottom 12 of the supporting leg device 10.

The traction member 300 is movably positioned in a hollow sleeve 310. The traction member 300 is a flexible elongated member such as a pulling wire, and made of tensile materials such as metal, fabric, rubber, or plastic. The sleeve 310 is a hollow tube, which is wrapped around the traction member 300 to guide the movement of the traction member 300, so that when one end of the traction member 300 is pulled out of the sleeve 310, the other end of the traction member 300 will be pulled into the sleeve 310. The sleeve 310 may be made of materials such as metal, fabric, rubber or plastic, having certain elasticity and certain rigidity. The sleeve 310 has elasticity to ensure that the sleeve 310 can be bent and deformed accordingly when the supporting leg device 10 is retracted, so that the sleeve 310 cannot hinder the expansion and contraction of the supporting leg device 10. The sleeve 310 has rigidity to ensure that the sleeve 310 can guide the movement of the traction member 300, and that the entire length of the sleeve 310 cannot be changed due to the movement of the traction member 300.

The sleeve 310 has an upper end 311 configured to be immobile relative to the top 11 of the supporting leg device 10, and a lower end 312 configured to be immobile relative to the bottom 12 of the supporting leg device 10. A first end 301 of the traction member 300 extends from the upper end 311 of the sleeve 310 and is fixed to the indicating member 100, so that the indicating member 100 can be pulled to pivot to the second position in the second direction opposite to the first direction. The second end 302 of the traction member 300 protrudes from the lower end 312 of the sleeve 310 and is arranged such that the upward movement of the pushing member 200 can drive the upward movement of the second end 302 of the traction member 300.

The upper end 311 of the sleeve 310 is configured in various manners to be immobile relative to the top 11 of the supporting leg device 10. For example, in another embodiment, as shown in FIG. 5, a sleeve upper end fixing member 130 may be fixed to the top 11 of the supporting leg device 10; and the upper end 311 of the sleeve 310 is fixed to the sleeve upper end fixing member 130. The sleeve upper end fixing member 130 may be fixed to the top 11 of the supporting leg device 10 via a frame 40. The sleeve upper end fixing member 130 and the frame 40 can be fixed by means of various conventional connection methods such as screws and rivets. Certainly, the upper end 311 of the sleeve 310 can also be directly fixed to the top 11 of the supporting leg device 10 or to other components arranged at the top 11.

On another aspect, as for that the lower end 312 of the sleeve 310 is configured to be immobile relative to the bottom 12 of the supporting leg device 10, and the second end 302 of the traction member 300 is configured such that the upward movement of the pushing member 200 can drive the upward movement of the second end 302 of the traction member 300, the above can be implemented in various manners, which will be described in detail below by taking an example.

Hereinafter, it will be described how the pushing member 200 and the traction member 300 drive the indicating member 100 to pivot to the second position in the second direction.

When the supporting leg device 10 touches the ground, the ground contact end 201 of the pushing member 200 first touches the ground, so that the pushing member 200 moves upward relative to the bottom 12 of the supporting leg device 10, so as to drive the upward movement of the second end 302 of the traction member 300, and the first end 301 of the traction member 300 moves downward relative to the top 11 of the supporting leg device 10 to pull the indicating member 100, so as to allow the indicating member 100 to withstand the acting force of the first elastic member 120 to pivot to the second direction, so that the second area 102 of the indicating member 100 is exposed from the indicator window 111.

It should be noted that since the two ends of the sleeve 310 are respectively fixed with respect to the top 11 and the bottom 12 of the supporting leg device 10, when the supporting leg device 10 is retracted to change a distance between the top 11 and the bottom 12 of the supporting leg device 10, only the distance between the two ends of the sleeve 310 changes. However, as long as the supporting leg device 10 does not touch the ground, this change cannot get the traction member 300 within the sleeve 310 pulled, and the indicating member 100 cannot pivot to the second position. In addition, when the supporting leg device 10 is extended to the maximum, the distance between the two ends of the sleeve 310 is the largest, so that the sleeve 310 may have a length that is set to be longer than the length of the sleeve as required in this case, so as to ensure that the extension of the supporting leg device 10 cannot be limited by the length of the sleeve 310.

Figure 7:
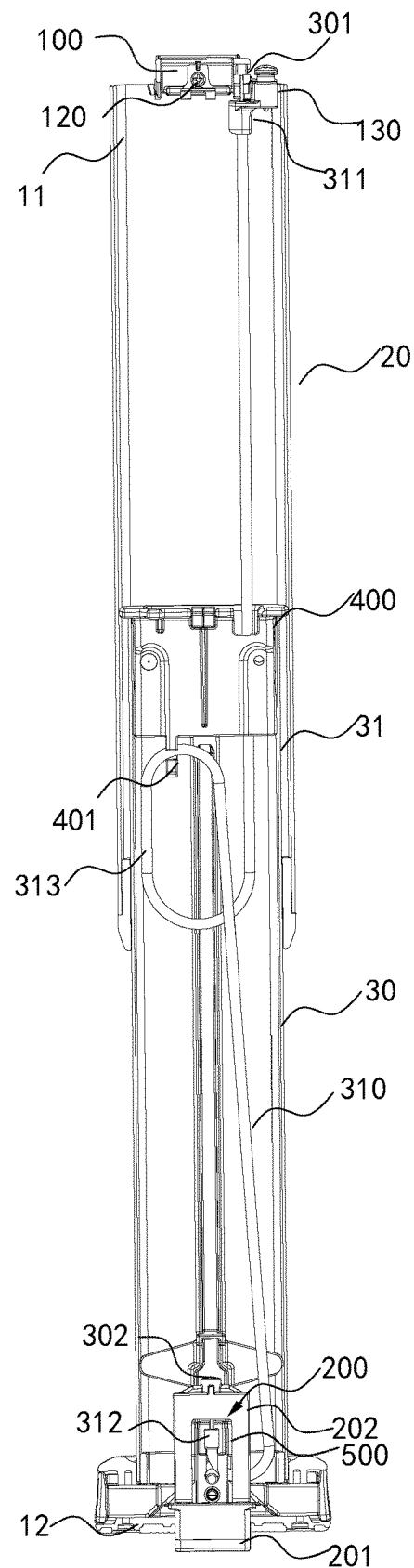
FIG. 7 is a front cross-sectional view of the second embodiment of the indicator assembly according to the present disclosure.
Figure 11:
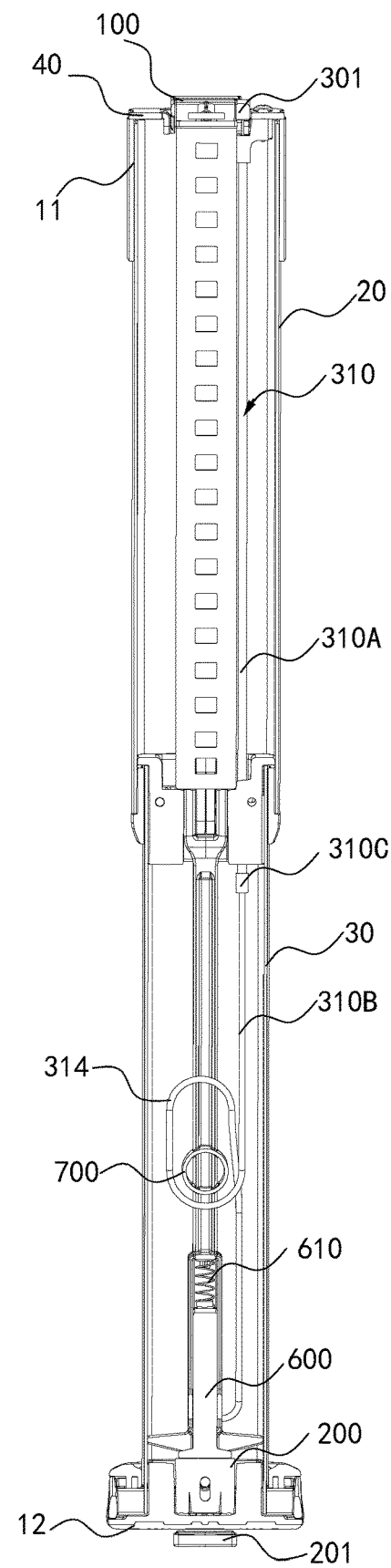
FIG. 11 is a front cross-sectional view of the third embodiment of the indicator assembly according to the present disclosure.

In addition, for attractive appearance and ease of use, the sleeve 310 is entirely positioned inside the supporting leg device 10, as shown in FIGS. 5, 7 and 11, but the sleeve 310 can also be partially or completely provided outside the supporting leg device 10.

In order to allow a person skilled in the art to understand the present disclosure more clearly, several preferred examples of the present disclosure will be described in detail.

Figure 6:
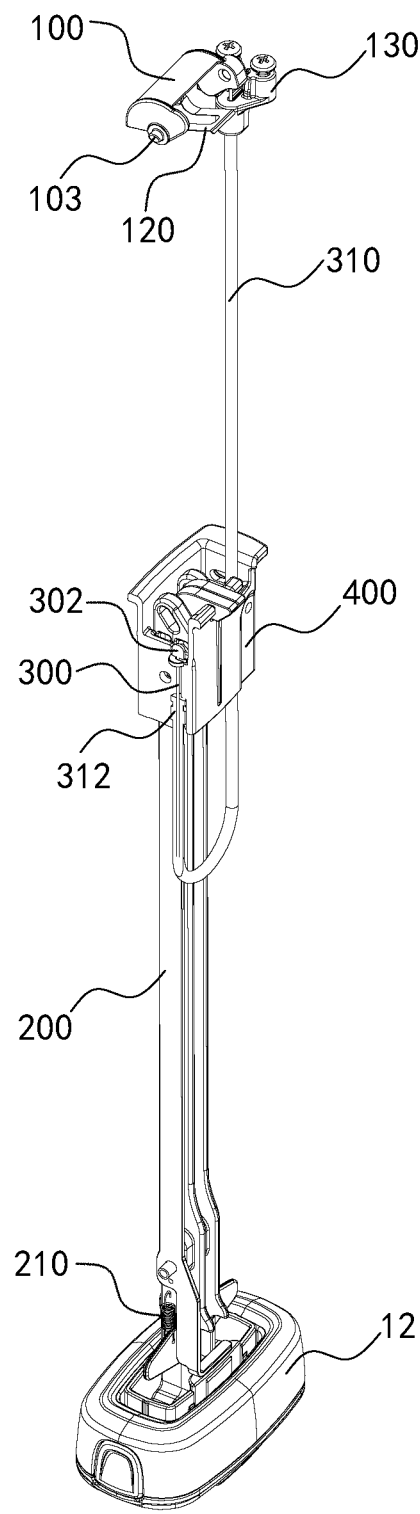
FIG. 6 is a perspective view of the indicator assembly after removing the first tube and the second tube in FIG. 5.

FIGS. 5 to 6 show the first embodiment of the present disclosure.

In this embodiment, the lower end 312 of the sleeve 310 is positioned close to an upper end 31 of a second tube 30; the upper end 31 of the second tube 30 is provided with a remaining member 400, and the lower end 312 of the sleeve 310 may be fixed to the remaining member 400. In this way, since the remaining member 400 provided on the second tube 30 is immobile relative to the lower end of the second tube 30, the lower end 312 of the sleeve 310 fixed to the remaining member 400 may be immobile relative to the lower end of the second tube 30 (i.e., the bottom 12 of the supporting leg device 10). Certainly, the lower end 312 of the sleeve 310 may also be directly fixed to an inner wall of the upper end 31 of the second tube 30 or provided on other components at the upper end 31.

Meanwhile, in the case that the lower end 312 of the sleeve 310 is positioned close to the upper end 31 of the second tube 30, in order to realize that the upward movement of the pushing member 200 can drive the upward movement of the second end 302 of the traction member 300, the pushing member 200 moves upward along a longitudinal direction of the supporting leg device 10 from the ground contact end 201 until a height of the upper part 202 of the pushing member exceeds beyond a height of the lower end 312 of the sleeve 310, and the second end 302 of the traction member 300 is fixed to the upper part 202 of the pushing member 200. In the case that the lower end 312 of the sleeve 310 is fixed to the remaining member 400, the upper part 202 of the pushing member 200 needs to pass through the remaining member 400, as shown in FIGS. 5 and 6. Since the pushing member 200 extends from the lower end of the second tube 30 (i.e., the bottom 12 of the supporting leg device 10) to the upper end 31 of the second tube 30, that is to say, the pushing member 200 almost extends along the entire length of the second tube 30, so that in FIGS. 5 and 6, the pushing member 200 may be shown as a sheet-like elongated member, but also be a rod member.

It should be noted that the "height" mentioned in the present disclosure refers to a height from the bottom 12 of the supporting leg device 10.

The pushing member 200 may be connected to a second elastic member 210 that forces the pushing member 200 to move downward relative to the bottom 12 of the supporting leg device 10. Thus, when the supporting leg device 10 leaves from the ground, under the action of the second elastic member 210, the pushing member 200 moves downward relative to the bottom 12 of the supporting leg device 10, and the ground contact end 201 thereof extend out of the bottom 12 of the supporting leg device 10 once more, at the same time, the upper part 202 and the second end 302 of the traction member 300 also move downward, so that the traction member at the second end 302 may retract downward into the sleeve 310; accordingly, the traction member at the first end 301 may move upward to extend out of the sleeve 310, so that under the action of the first elastic member 120, the indicating member 100 pivots to the first position along the first direction.

The second elastic member 210 is made of an elastic material, and may include a spring, an elastic piece, or any elastic element capable of providing a driving force. Although FIGS. 5 and 6 show that the second elastic member 210 is a tension spring provided at the pushing member 200, but the present disclosure is not limited thereto, the second elastic member 210 may be provided at any suitable position of the pushing member 200 as long as the pushing member 200 is forced to move downward.

FIGS. 7 to 10 show the second embodiment of the present disclosure.

In this embodiment, the lower end 312 of the sleeve 310 is positioned close to the bottom 12 of the supporting leg device 10; the bottom 12 of the supporting leg device 10 includes a sleeve lower end fixing member 500, and the lower end 312 of the sleeve 310 is fixed to the sleeve lower end fixing member 500. In this way, since the sleeve lower end fixing member 500 is immobile relative to the bottom 12 of the supporting leg device 10, the lower end 312 of the sleeve 310 fixed to the sleeve lower end fixing member 500 is immobile relative to the bottom 12 of supporting leg device 10. The lower end 312 of the sleeve 310 may also be directly fixed to the bottom 12 of the supporting leg device 10 or the inner wall of the lower end of the second tube 30.

Figure 8:
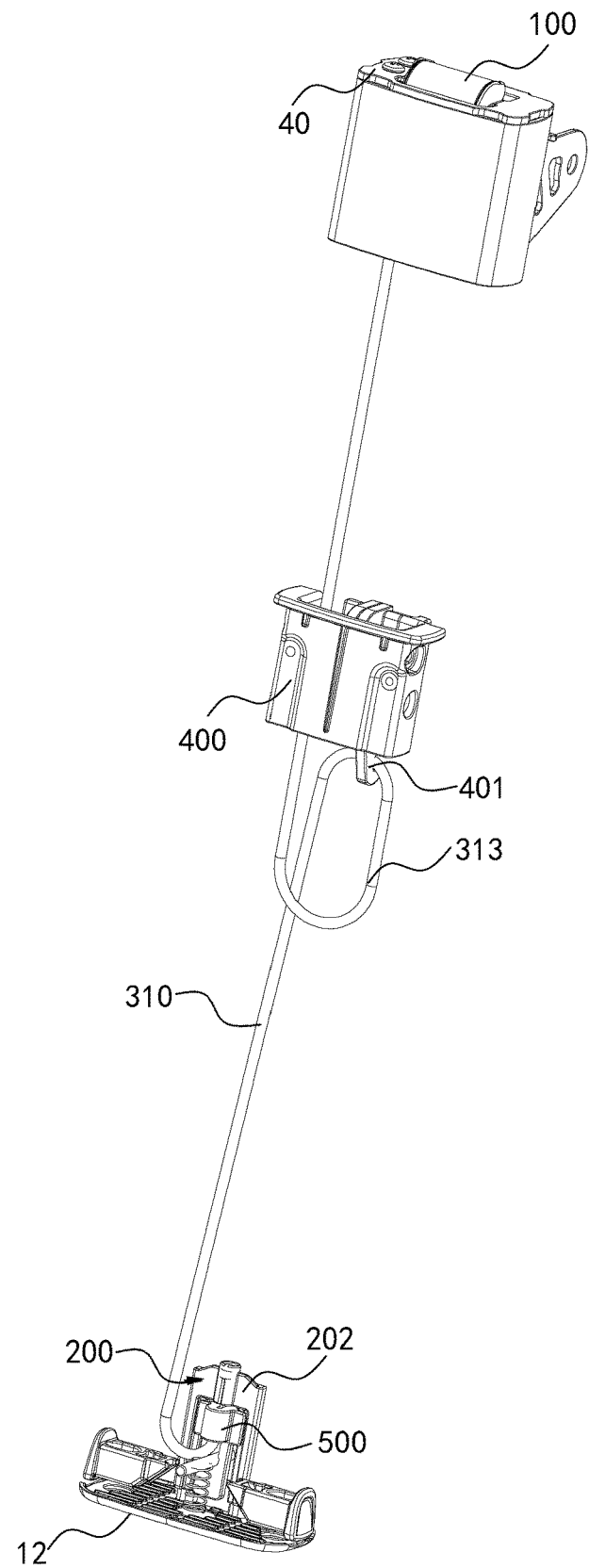
FIG. 8 is a perspective view of the indicator assembly after removing the first tube and the second tube in FIG. 7.
Figure 9:
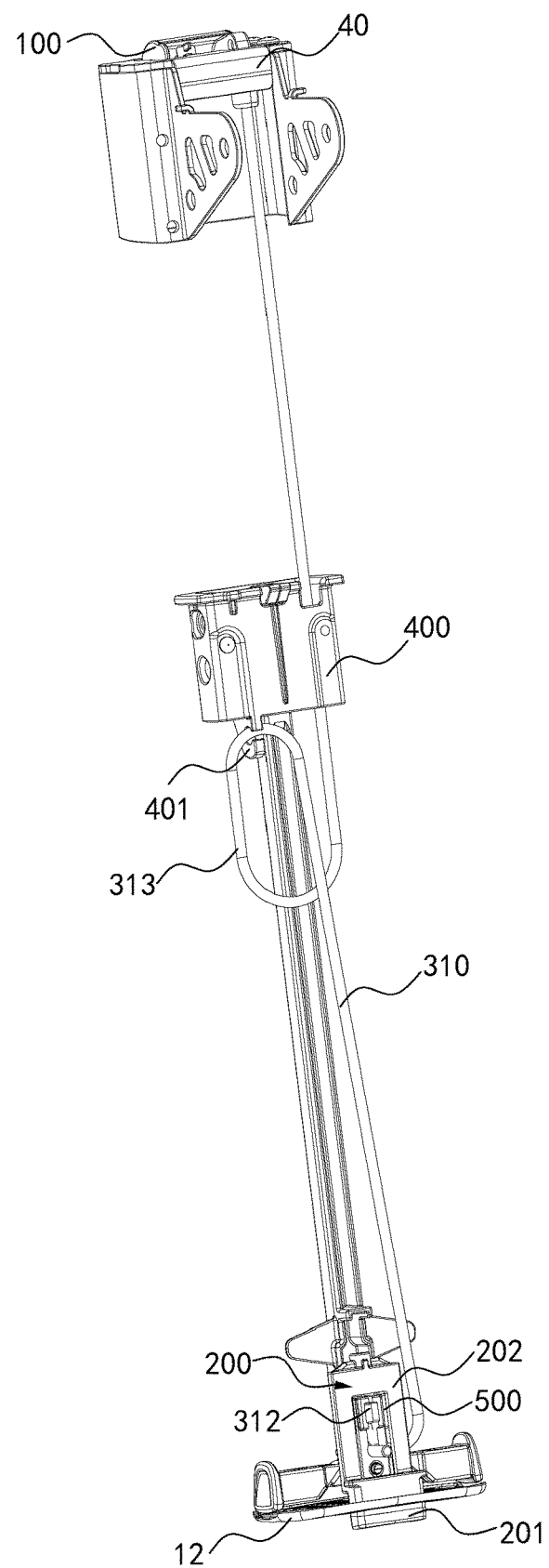
FIG. 9 is a perspective view at another angle of the indicator assembly after removing the first tube and the second tube in FIG. 7.
Figure 10:
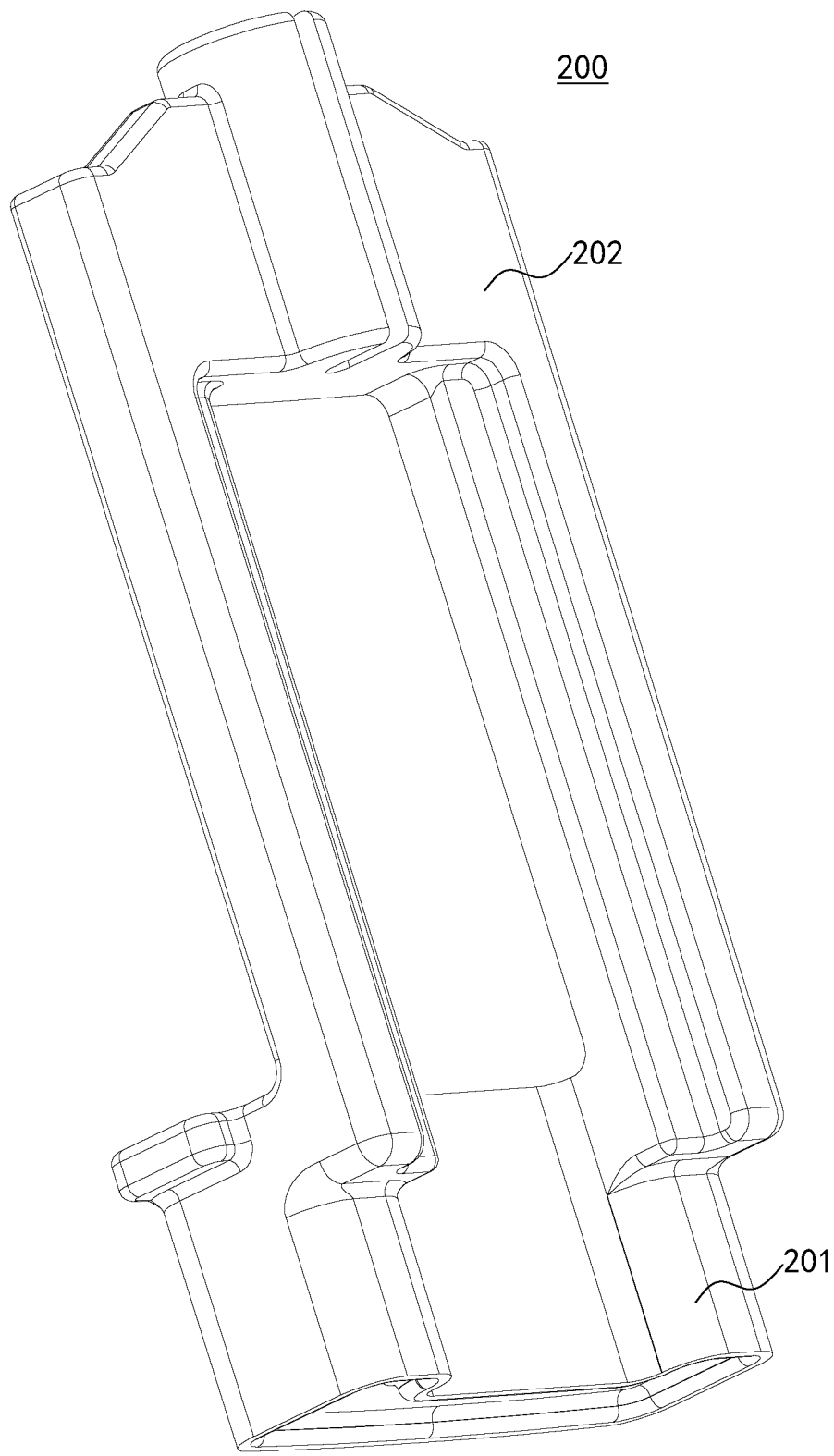
FIG. 10 is an enlarged perspective view of a pushing member in FIG. 7.

Meanwhile, in the case that the lower end 312 of the sleeve 310 is positioned close to the bottom 12 of the supporting leg device 10, in order to realize that the upward movement of the pushing member 200 drives the upward movement of the second end 302 of the traction member 300, the pushing member 200 extends upward along the longitudinal direction of the supporting leg device 10 from the ground contact end 201 until a height of the upper part 202 of the pushing member exceeds beyond a height of the lower end 312 of the sleeve 310, and the second end 302 of the traction member 300 is fixed to the upper part 202 of the pushing member 200. FIG. 10 is a perspective view showing a solution of the pushing member 200. Certainly, the pushing member 200 may be achieved by virtue of other solutions as long as the above requirements can be satisfied. In this example, since the lower end 312 of the sleeve 310 is not high, the height of the pushing member 200 extending upward does not need to be high. The sleeve lower end fixing member 500 is positioned under the upper part 202 of the pushing member 200, as shown in FIGS. 7-9.

The pushing member 200 in this example may also be connected with a second elastic member 210, which is not shown through, the second elastic member 210 forces the pushing member 200 to move downward relative to the bottom 12 of the supporting leg device 10.

FIGS. 11 to 14 show the third embodiment of the present disclosure.

In this embodiment, the lower end 312 of the sleeve 310 is positioned close to the bottom 12 of the supporting foot device. For example, the lower end 312 of the sleeve 310 may be directly fixed to the inner wall of the lower end of the second tube 30 or other components provided at the bottom 12 of the supporting leg device 10, so that the lower end 312 of the sleeve 310 is immobile relative to the bottom of the supporting leg device 10.

Meanwhile, in the case that the lower end 312 of the sleeve 310 is positioned close to the bottom 12 of the supporting leg device 10, in order to realize that the upward movement of the pushing member 200 drives the upward movement of the second end 302 of the traction member 300, the pushing member 200 is provided with a driving member 600 which extends upward in the longitudinal direction of the supporting leg device 10 so that a height of an upper part 601 of the driving member exceeds beyond a height of the lower end 312 of the sleeve 310, and the second end 302 of the traction member 300 is fixed to the upper part 601 of the driving member 600. In this example, since the lower end 312 of the sleeve 310 is not high, the height of the driving member 600 extending upward does not need to be high.

The driving member 600 is connected to a third elastic member 610 which forces the driving member 600 to move downward relative to the bottom 12 of the supporting leg device 10. Thus, when the supporting leg device 10 leaves from the ground, under the action of the third elastic member 610, the driving member 600 moves downward relative to the bottom 12 of the supporting leg device 10, so that the pushing member 200 also moves downward, and the ground end 201 thereof extends from the bottom 12 of the supporting leg device 10 once more. At the same time, the upper part 601 of the driving member 600 and the second end 302 of the traction member 300 also move downward, so that the traction member at the second end 302 may be retracted downward into the sleeve 310. Accordingly, the traction member at the first end 301 may move upward and extend out of the sleeve 310, so that under the action of the first elastic member 120, the indicating member 100 pivots to the first position in the first direction.

The third elastic member 610 is made of an elastic material, and may include a spring, an elastic piece, or any elastic element capable of providing a driving force. Although FIGS. 11 to 14 show that the third elastic member 610 is a compression spring provided on the driving member 600, but the present disclosure is not limited thereto. The third elastic member 610 may be provided at any suitable position of the driving member 600 or the pushing member 200 as long as the pushing member 200 is finally forced to move downward.

Furthermore, in the second and third embodiments of the present disclosure, since the lower end 312 of the sleeve 310 is positioned close to the bottom 12 of the supporting leg device 10, when the upper end 311 of the sleeve 310 is fixed to the top 11 of the supporting leg device 10 or the components at this location, the supporting leg device 10 extends to the maximum and retracts to the minimum, a distance between the two ends of the sleeve 310 changes greatly. In order to ensure that the extension of the supporting leg device 10 is not limited by the length of the sleeve 310, the length of the sleeve 310 is often set to be longer, so that when the supporting leg device 10 is retracted, the sleeve 310 is wound inside the supporting leg device 10. In order to avoid affecting the expansion and contraction of the supporting leg device 10 due to that the sleeve 310 is wound together, two ways in the present disclosure are used to adjust the sleeve 310.

The first manner is shown in FIGS. 7-9, a remaining member 400 is provided at the upper end 31 of the second tube 30, and the sleeve 310 is wound to be a first loop 313 in a space under the remaining member 400 within the supporting leg device 10. The lower part of the remaining member 400 extends from a sleeve remaining part 401, and the first loop 313 is suspended on the sleeve remaining part 401.

The second manner is shown in FIGS. 11-14, the sleeve 310 includes a first section 310A close to the upper end 311 and a second section 310B close to the lower end 312. The first section 310A is a leather sleeve, and the second section 310B is a spring sleeve, and the first section 310A and the second section 310B are connected at a node 310C. In this way, due to the great rigidity of the leather sleeve, the first section 310A is basically not wound. On the contrary, due to the great elasticity of the spring sleeve, winding is likely to occur at the second section 310B, thereby effectively limiting the length of the sleeve that may be wound.

Figure 12:
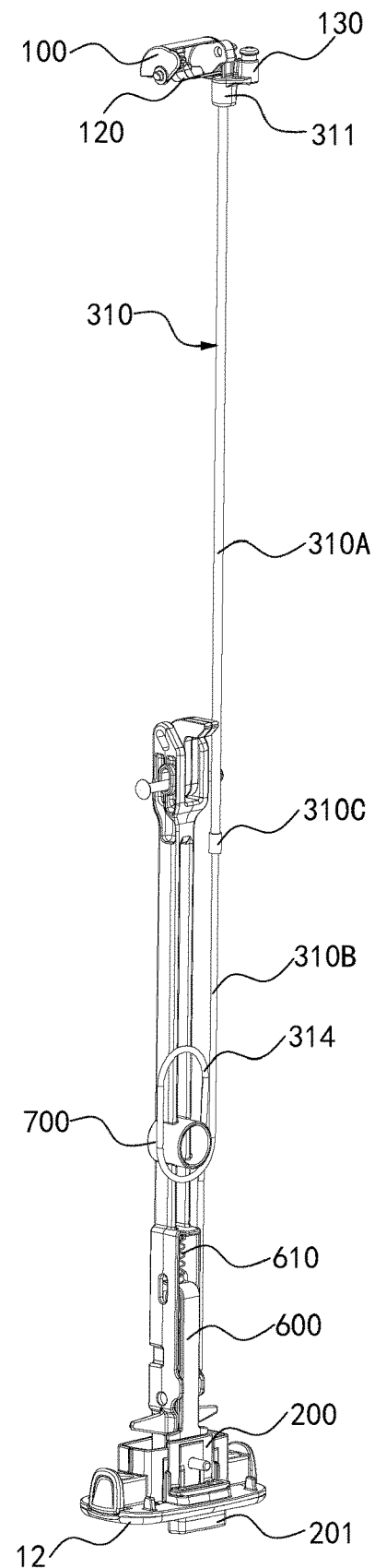
FIG. 12 is a perspective view of the indicator assembly after removing the first tube and the second tube in FIG. 11.
Figure 13:
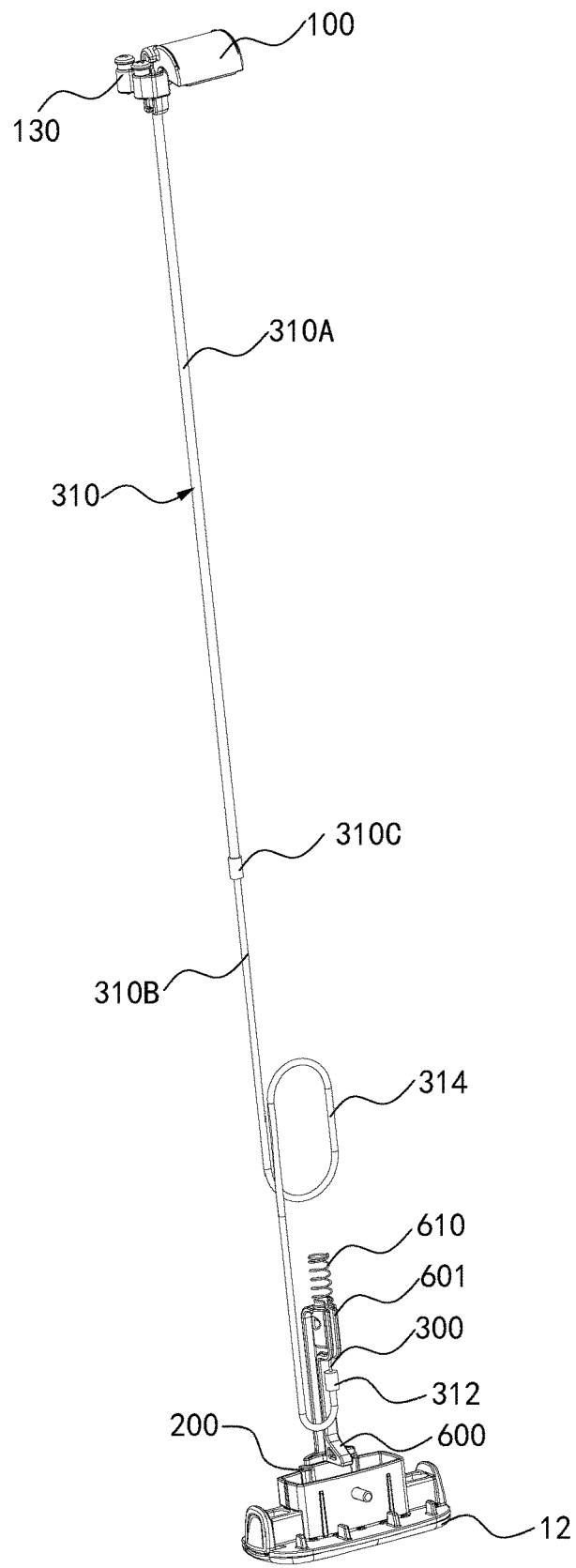
FIG. 13 is a perspective view at another angle of the indicator assembly after removing the first tube, the second tube and some members in FIG. 11.
Figure 14:
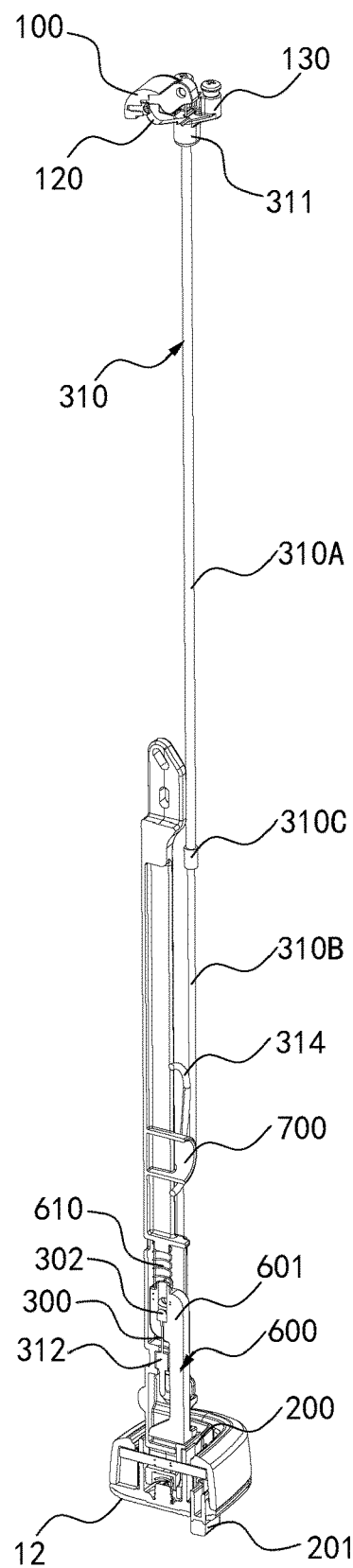
FIG. 14 is a cross-sectional view of the indicator assembly after removing the first tube and the second tube in FIG. 11.

The second section 310B of the sleeve 310 may be wound to be a second loop 314. The second loop 314 is wound on a post member 700 within the supporting leg device 10. The post member 700 may be formed on an inner wall of the supporting leg device 10, or may be formed on other components within the supporting leg device 10 as shown in FIGS. 11 and 12.

An advantageous effect of the present disclosure is that the indicator assembly of the supporting leg device for the safety seat according to the present disclosure allows the user to check whether the supporting leg device has touched the ground of the vehicle without leaning over, and thus ensure that the safety seat is firmly supported by the supporting leg device.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated. The novel features which are considered as characteristic of the invention are set forth in particular in the appended claims.

What is claimed is:

1. An indicator assembly of a supporting leg device for a safety seat, wherein the indicator assembly comprises:
    an indicator housing adapted to be positioned at a top of the supporting leg device and having an indicator window that is formed by penetrating the indicator housing;
    an indicating member including a first area and a second area which are adjacent to each other and have different colors or patterns, the indicating member being pivotally accommodated in the indicator housing so that the first area and the second area can be alternatively exposed from the indicator window;
    a first elastic member contacting with the indicating member and driving the indicating member to pivot to a first position;
    a pushing member adapted to be placed inside the supporting leg device and movable up and down relative to a bottom of the supporting leg device, the pushing member including a ground contact end adapted to protrude from the bottom of the supporting leg device;
    a traction member movably positioned within a hollow sleeve, wherein the sleeve has an upper end configured to be immobile relative to the top of the supporting leg device, and a lower end configured to be immobile relative to the bottom of the supporting leg device; wherein a first end of the traction member protrudes from the upper end of the sleeve and is fixed to the indicating member, so that the indicating member is pulled so as to pivot to a second position, and a second end of the traction member protrudes from the lower end of the sleeve and is configured so that an upward movement of the pushing member drives an upward movement of the second end of the traction member.

2. The indicator assembly of the supporting leg device for a safety seat according to claim 1, wherein
    the indicator housing is adapted to be connected to an upper end of a first tube of the supporting leg device.

3. The indicator assembly of the supporting leg device for the safety seat according to claim 2, wherein the lower end of the sleeve is adapted to be positioned close to an upper end of a second tube of the supporting leg device that is slidably disposed inside the first tube of the supporting leg device, and the pushing member extends upward and a height of an upper part of the pushing member exceeds beyond a height of the lower end of the sleeve, and the second end of the traction member is fixed to the upper part of the pushing member.

4. The indicator assembly of the supporting leg device for the safety seat according to claim 2, wherein an upper part of the pushing member is adapted to pass through a retaining member provided at an upper end of a second tube of the supporting leg device that is slidably disposed inside the first tube of the supporting leg device, and the lower end of the sleeve is adapted to be fixed to the retaining member.

5. The indicator assembly of the supporting leg device for the safety seat according to claim 2, wherein the lower end of the sleeve is positioned close to the bottom of the supporting leg device, and the pushing member extends upward and a height of an upper part of the pushing member exceeds beyond a height of the lower end of the sleeve, and the second end of the traction member is fixed to the upper part of the pushing member.

6. The indicator assembly of the supporting leg device for the safety seat according to claim 2, wherein a remaining member is provided at the upper end of the second tube, and the sleeve is adapted to be wound into a first loop in a space under the remaining member within the supporting leg device.

7. The indicator assembly of the supporting leg device for the safety seat according to claim 6, wherein a lower part of the remaining member extends from a sleeve remaining part, and the first loop is suspended on the sleeve remaining part.

8. The indicator assembly of the supporting leg device for the safety seat according to claim 1, wherein an upper part of the pushing member is adapted to be positioned over the sleeve lower end fixing member provided with the bottom of the supporting leg device, and the lower end of the sleeve is adapted to be fixed to the sleeve lower end fixing member.

9. The indicator assembly of the supporting leg device for the safety seat according to claim 1, wherein a second elastic member is connected to the pushing member, and the second elastic member forces the pushing member to move downward relative to the bottom of the supporting leg device.

10. The indicator assembly of the supporting leg device for the safety seat according to claim 1, wherein the lower end of the sleeve is adapted to be positioned close to the bottom of the supporting leg device, and a driving member is arranged on the pushing member, and the driving member extends upward and a height of an upper part of the driving member extends beyond a height of a lower end of the sleeve, and the second end of the traction member is fixed to the upper part of the driving member.

11. The indicator assembly of the supporting leg device for the safety seat according to claim 10, wherein a third elastic member is connected to the driving member, and the third elastic member forces the driving member to move downward relative to the bottom of the supporting leg device.

12. The indicator assembly of the supporting leg device for the safety seat according to claim 1, wherein the sleeve includes a first section close to the upper end and a second section close to the lower end, wherein the first section is a leather sleeve, the second section is a spring sleeve, and the first section and the second section are connected at a node.

13. The indicator assembly of the supporting leg device for the safety seat according to claim 12, wherein the second section of the sleeve is adapted to be wound into a second loop, and the second loop is adapted to be wound around a post member within the supporting leg device.

14. The indicator assembly of the supporting leg device for the safety seat according to claim 1, wherein the upper end of the sleeve is adapted to be fixed to a sleeve upper end fixing member fixed to the top of the supporting leg device.

15. The indicator assembly of the supporting leg device for the safety seat according to claim 1, wherein a bottom of the ground contact end is made of a thermoplastic elastomer material.

16. The indicator assembly of the supporting leg device for the safety seat according to claim 1, wherein when the ground contact end of the pushing member does not touch the ground, the indicating member pivots to the first position and the first area is exposed from the indicating window.

17. The indicator assembly of the supporting leg device for the safety seat according to claim 1, wherein when the ground contact end of the pushing member touches the ground, the pushing member moves upward relative to the bottom of the supporting leg device to drive the second end of the traction member to move upward, the first end of the traction member moves downward relative to the top of the supporting leg device to pull the indicating member, the indicating member pivots to the second position, and the second area is exposed from the indicating window.

18. A safety seat employing the indicator assembly of the supporting leg device for the safety seat according to claim 1.

* * * * *